Dec. 7, 1937.    G. WIGET    2,101,663
SHUTTLE BOX MECHANISM FOR LOOMS
Filed Aug. 12, 1936    2 Sheets-Sheet 1

INVENTOR
Georg Wiget
BY
Redding, Greeley & O'Shea
ATTORNEYS

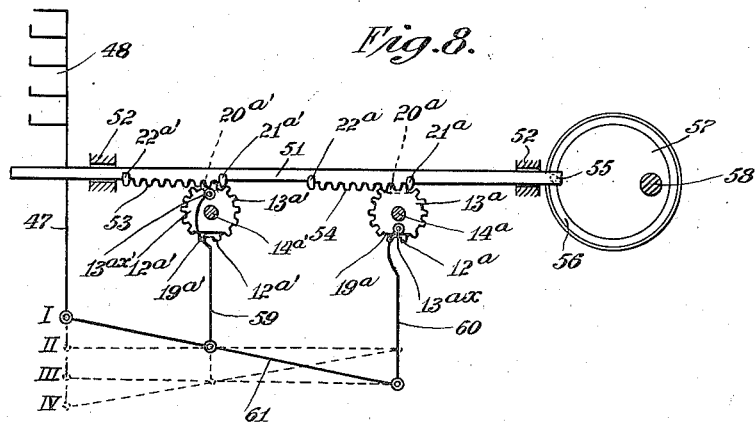
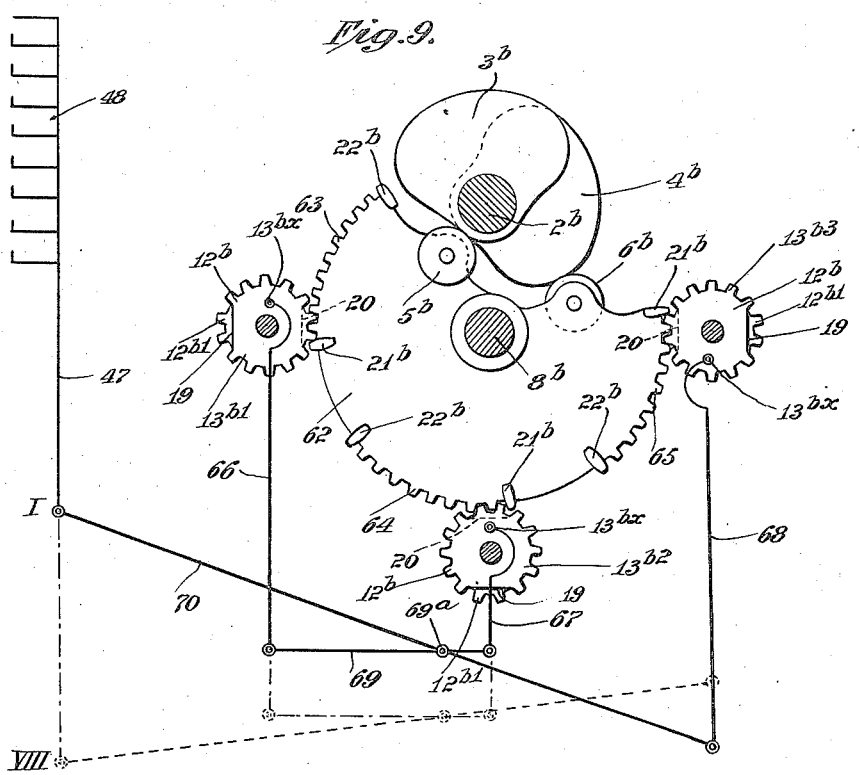

Patented Dec. 7, 1937

2,101,663

UNITED STATES PATENT OFFICE 2,101,663

SHUTTLE BOX MECHANISM FOR LOOMS

Georg Wiget, Arbon, Switzerland, assignor to Societe Anonyme Adolphe Saurer, Arbon, Switzerland, a corporation of Switzerland Application August 12, 1936, Serial No. 95,542
In Germany September 12, 1935

4 Claims. (Cl. 139—173)

This invention relates to mechanism for effecting, under the control of a pattern selector device, the shifting of a multi-cell pattern box for the purpose of placing one or another of several shuttles in the line of the shed. Mechanisms of this character as designed heretofore have been subject in operation to the development of shocks or blows which materially reduce the speed of operation. This difficulty is overcome by the present invention in which a reciprocating toothed member or driving gear cooperates with a driven gear which has members side by side so mutilated that the driving gear may operate idly when in alignment with one of such gear members and yet a complete half rotation of the driven gear shall be assured. The toothed segments of the driven gear overlap at each end by at least one tooth so that the driven gear is at all times in engagement with the driving gear, whereby the occurrence of shocks and blows, due to the reengagement of the driving gear with the driven gear, is avoided, the longitudinal shifting of the driven gear to bring one or the other of the mutilated members into engagement with the driving gear taking place during the idling movement of the driving gear. Through the embodiment of this invention in a shuttle box mechanism it is possible to operate the loom at higher speeds than is ordinarily possible, with a corresponding increase in the output of the loom. Provision is made whereby the driven gear is held from rotation during the idling movement of the driving gear.

Different embodiments of the invention are illustrated in the accompanying drawings, in which:

Figure 4 is a detail view on a larger scale of parts to be referred to.

Figure 8 is a partly diagrammatic view illustrating an embodiment of the invention in which the driving gear reciprocates in a right line.

Figure 9 is a detail view illustrating a different embodiment of the invention in which the reciprocating driving gear is shown as a portion of a disc and in engagement with three driven gears arranged peripherally.

Figure 1:
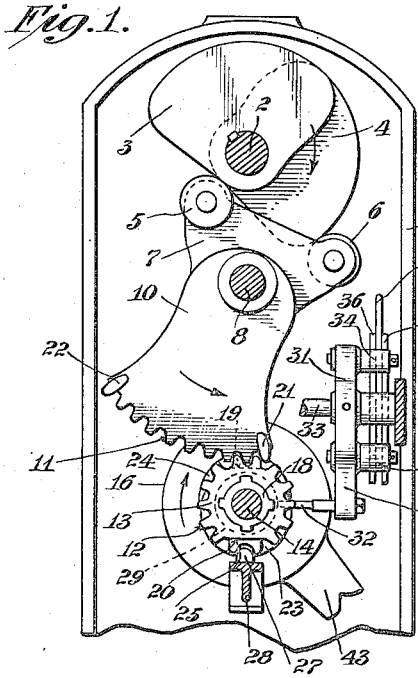
Figure 1 is a view in sectional elevation on a plane indicated by the broken line 1—1 of Figure 2.

In the embodiment of the invention illustrated in Figures 1–7 the supporting frame or housing 1 has mounted therein a driving shaft 2, to which are secured cams 3 and 4 which cooperate, respectively, with rollers 5 and 6 of a rocker lever 7 which is mounted on a shaft 8 and embodies two separated gear segments 9 and 10 herein referred to as the driving gears. The toothed segment 11 of each driving gear is arranged to engage with the mutilated gear member 12 or the mutilated gear member 12' of a driven gear 13 which is displaceable in an axial direction on the sleeve 17, 18 of a corresponding control disc 15, 16, the sleeved control discs being mounted on a shaft 14. Each driven gear 13 is splined on the corresponding sleeve 17 or 18 so that the gears 13 which rotate with the control discs 15, 16 shall also be displaceable axially.

The two mutilated driven gears 12 and 12' of each driven gear 13 are arranged side by side, each gear member 12 being mutilated at one point by the cutting away of the teeth to form a gap, as at 20, which is of such extent that when it is alined with the driving gear 9 or 10, as the case may be, the driving gear may then operate idly. Similarly each gear member 12' is mutilated to form a gap, as at 19, at a point diametrically opposite the gap 20 of the gear member 12, for the same purpose.

Each gear segment 11 is provided at each end of its range of gear teeth 11 with a wide tooth 21, 22, which projects on each side by about the width of the tooth portion 11.

Secured to or formed integral with each driven gear 13 are two juxtaposed eccentrics 23, 24 which are displaced the one with respect to the other by 180 degrees, the swell of each eccentric being formed with a notch 25, 26, diametrically opposed, adapted to be engaged by a spring loaded latch 27 mounted in a guide 28 in order to hold the corresponding driven gear from rotary movement during the idling movement of the driving gear.

The hub of each driven gear 13 is provided with a peripheral groove 29 which is engaged by a stud 32 of a corresponding bent lever 30, 31 mounted for oscillation on a stud 33. The arm 31 of each lever carries a roller 34 for coaction with the upper portion of a movable cam 36 at the right or 37 at the left. The arm 30 of each such lever carries a roller 35 for coaction with the lower portion of the movable cam 36 or 37, as the case may be. The cams 36 and 37 are carried, respectively, by rods 38, 39 of an automatic pattern selector device which is of usual construction and need not be shown or described herein. By such rod 38 or 39 the corresponding cam 36 or 37 is moved to cause the corresponding driven gear 13 to be displaced axially with respect to the driving gear 11, so that the one driven gear member or the other shall be engaged by the driving gear 11 to effect rotation of the driven gear through 180 degrees, except when the gap 19 or 20 registers with the driving gear, at which time the driven gear is held from rotary movement by the latch 27.

The control disc 16 has an eccentric 40 on which is mounted a disc 41 and on the disc 41 is mounted a ring 42 which has an extended arm 43. The latter has pivotally connected thereto one arm 44 of a bell crank lever which is pivotally mounted at 45, the other arm 46 of the bell crank lever being connected by a link 47 with the shuttle box, as diagrammatically shown in Figure 7, in which the different positions of the bell crank lever are represented by the broken lines I—II—III—IV, with corresponding changes in the position of the shuttle box 48. The control disc 15 has secured thereto an eccentric pin 49 which engages a radial groove 50 in the largest diameter of the disc 41. Through the interrelation of the eccentric pins and discs as described the requisite movement is imparted to the bell crank lever 44, 46. It will be understood that the eccentric pin 49 moves in the radial groove 50 of the disc 51.

In the operation of the mechanism illustrated in Figures 1-7 and above described, when the driving shaft 2 is made to rotate at the will of the operator, the rocker lever 7 by reason of the shape given to the cams 3 and 4 moves to and fro or reciprocates (in this instance with a swinging motion) with a dwell after each half rotation of the shaft 2 and after each movement of the rocker lever 7 in one direction or the other.

Figure 2:
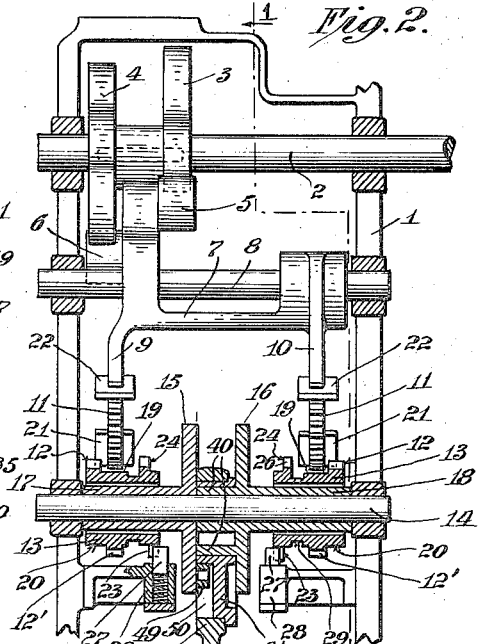
Figure 2 is a view of the same parts as seen from the left hand in Figure 1 with some parts in section.
Figure 5:
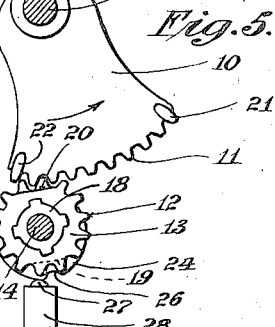
Figure 5 is a detail view of some of the parts shown in Figure 1, but in a different position.
Figure 4:
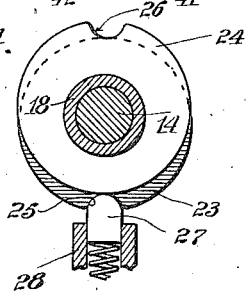

Continuing now the description of the interaction of the driving gear segment 10 and the corresponding driven gear 13, since the two driving gear segments 9, 10 and the two driven gears 13 are the same in each case and it is unnecessary to describe both in detail, it will be understood that, as shown at the right hand in Figure 2, the driving gear segment 10, 11 is then in registration with the gap 19 of the gear member 12' and can reciprocate freely so long as the driven gear 12' is held from rotation by engagement of the latch 27 with the notch 25 of the corresponding eccentric 23. If it be assumed that the shuttle change box 48 is then to be shifted the shifting rod 38 is pressed downward by the pattern selector device so that the cam lever 36, also pressed downward, causes the corresponding lever 30, 31, at the right hand of Figure 3, to be swung in a clockwise direction on its axis 33 and through the engagement of its stud 32 with the peripheral groove 39 in the hub of the right hand driven gear 13 causes the right hand driven gear 13 to be shifted toward the left. The driving gear segment 10 is then free to swing toward the right as indicated by the arrow in Figure 1. In the displacement of the driven gear 13 to the left the gear member 12 of the driven gear 13 moves into engagement with the gear segment 10, 11 alongside the gap 19, the retaining latch 27 being disengaged from the notch in the eccentric 23 in the initial movement of the gear 13 by reason of the engagement of the gear member 12 with the driving gear 10, 11. Through the continued engagement of the driving gear 10, 11 with the gear member 12 the driven gear 13 is rotated through almost a half rotation in a clockwise direction, as seen in Figure 1, and as the swing of the driving gear segment 10, 11 approaches the limit of its swing to the right, as represented in Figure 5, the gap 20 of the gear member 12 is in registration with the driving gear segment 10, 11 and the driven gear would remain at rest were it not that the end tooth 22 which projects at each side of the gear segment 10, 11 comes into engagement with the gear member 12' and effects a further turning of the driven gear 13 until a half rotation is completed. Thereupon the latch 27 engages with the notch 26 of the eccentric 24 and so holds the driven gear 13 against further turning, the tooth 22 having then passed out of engagement with the gear member.

Figure 7:
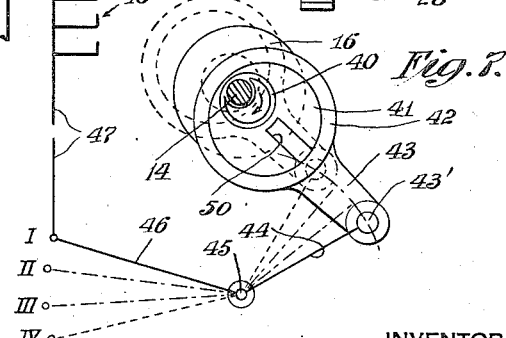
Figure 7 is a partly diagrammatic view illustrating the connections for shifting the shuttle box.

During such half rotation of the driven gear 13 the eccentric 40 of the control disc 16 causes such movement of the eccentric ring 42 that the arm 43 of the eccentric ring 42 moves the bell crank lever 44, 46 from the position I, represented by full lines in Figure 7, to the position II, represented by dot and dash lines in Figure 7, whereby the shuttle change box 48 is moved downward through one unit of change.

Figure 3:
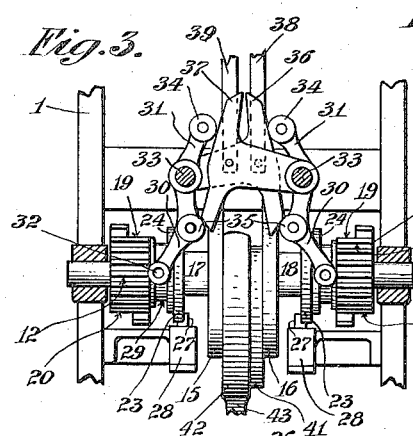
Figure 3 is a detail view of some of the parts shown in Figures 1 and 2 as seen from the right hand in Figure 1.
Figure 6:
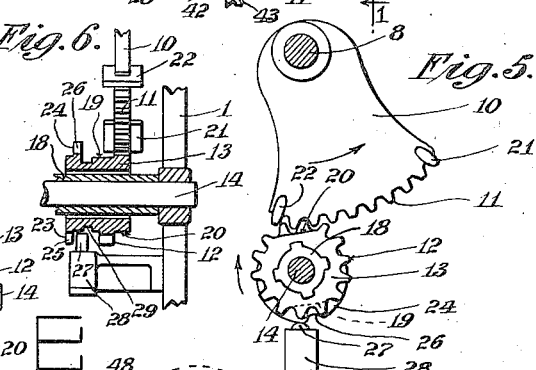
Figure 6 is a detail view in section of some of the parts shown in the lower right hand portion of Figure 2, but in a different position.

As the driving gear 10, 11 can now swing free in the gap 20, having an idling movement, the adjustment of the shuttle change box, effected as described above, continues until through the action of the pattern selector device the rod 38 is pulled upward and the driven gear 13 is again displaced to the right, into the position represented in Figures 2 and 3, the segmental driving gear 10, 11 again assuming the position shown in Figure 1 in a swing to the left. At this time the driving gear 10, 11 leaves the gap 20 and engages the gear member 12' of the driven gear 13 and the operation already described is again repeated, the half rotation of the gear 13 being completed by the action of the wide tooth 22, whereupon the latch 27 again engages the notch 25 of the eccentric 23 and prevents further rotation of the driven gear 13. In the second half rotation of the gear 13 the arm 43 is returned to the initial position and the bell crank 44, 46 is returned to the position I, represented by full lines in Figure 7, and the shuttle change box is returned to the corresponding initial position.

To effect the shift of the shuttle change box 48 to the position III, also represented by dot and dash lines in Figure 7, which indicate the corresponding position of the bell crank lever 44, 46, the right hand driven gear 13 remaining in the position last described, the left hand driven gear 13 is shifted to the right by the downward movement of the rod 39, through the action of the pattern selector device, into engagement with the segmental driving gear 9, 11. In this operation the eccentric disc 41, at that side of the mechanism, is turned through a half rotation, by the pen 49 which extends into the radial slot 50 of the eccentric disc 41, the bell crank lever 44, 46 being shifted into the position III, also represented by dot and dash lines, and the change shuttle box 48 being moved into corresponding position.

To effect the change of the bell crank lever 44, 46 to the position IV, represented by the line of dashes, with a corresponding shift in the position of the shuttle change box, the eccentric 40 must turn through a half rotation. This is effected substantially in the same manner as above described by a downward movement of the shifting rod 38 under the influence of the pattern selector device, with the result that the right hand driven gear 13 is shifted to the left and through the interaction of the gear segment 10, 11 and the right hand driven gear 13 the eccentric disc 40 is caused to have a half rotation.

It will be obvious that while in the operation already described the driving gear segments 9, 10 act on the driven gears only in one direction of swing, idling in the opposite direction of movement whereby the driven gear 13 is moved only in one direction of rotation, it may be arranged to have the driving gear segments 9, 10 operate in both directions of their movement, turning the driven gears 13 in one direction during the forward swing and turning the gears in the opposite direction during the return swing. This adjustment requires no change in the mechanism described and is effected by movement of the rods 38, 39 effected by the pattern selector device so that each driven gear 13, having been shifted in one direction during the swing of the driving gear segment in one direction is shifted back to its initial position immediately on the completion of the movement of the corresponding driving gear segment in one direction, the two two end teeth 21, 22 alternating in operation. For operation in connection with a loom which has a multi-shuttle box at only one side, the arrangement first described is sufficient, the alternative arrangement last referred to being useful only in connection with looms which have a multi-cell shuttle change box for each side.

It will be understood that the occurrence of shocks in the operation of the improved mechanism is avoided because at each change the driven gear members which are alternatively in engagement with the driving gear segments lie adjacent to each other in all positions of operation with their ranges of gear teeth overlapping by at least one tooth.

In the embodiment of the invention illustrated in Figures 1–7 and described above the driving gear is formed as a gear segment and reciprocates with an oscillating or swinging movement. In the embodiment of the invention illustrated diagrammatically in Figure 8 the driving gear 51 is moved to and fro or reciprocates in a right line, being formed as a straight bar guided, as at 52, and formed with toothed racks 53, 54.

In this instance the bar 51 has at one end a pin 55 in engagement with a groove 56 of an eccentric disc 57 on a driving shaft 58. Two driven gears $13^a$ and $13^{a1}$, mounted on shafts $14^a$ and $14^{a1}$ and composed each of two gear members $12^a$ and $12^{a1}$, each having a gap, as at $19^a$, $19^{a1}$, $20^a$, $20^{a1}$, diametrically opposed, are adapted for engagement, respectively, with the racks 53, 54. Each of such racks 53, 54 is provided at its ends with extended teeth $21^a$, $21^{a1}$, $22^a$, $22^{a1}$ which coact with the driven gears $13^a$ and $13^{a1}$ in the same manner as already described with reference to the construction illustrated in Figures 1–7.

The gear $13^a$ is provided with an eccentric pin $13^{ax}$ to which is pivotally connected a link 60 which has pivotally connected thereto one end of a lever 61 the other end of which is pivotally connected to the link 47 which is connected to the shuttle change box 48 as before. The gear $13^{a1}$ similarly is provided with an eccentric pin $13^{ax1}$ which is connected by a link 59 with the fulcrum of the lever 61.

It will be obvious that this embodiment of the invention is functionally the same as that shown in Figures 1–7, the essential change being in the substitution of a driving gear which reciprocates in a right line for the swinging driving gear of the construction shown in Figures 1–7.

In the embodiment of the invention shown somewhat diagrammatically in Figure 9, the reciprocating member is shown as a multiple gear segment 62, mounted on a shaft $8^b$ and having rollers $5^b$ and $6^b$ which cooperate with cams $3^b$ and $4^b$, similar to the cams shown in Figure 1, and mounted on a driving shaft $2^b$. The gear segment moves to and fro or reciprocates or oscillates on its axis through the coaction of the cams $3^b$ and $4^b$, as described with reference to the embodiment of the construction shown in Figure 1. The driving gear segment has three toothed sectors 63, 64 and 65 with which are severally engaged driven gears $13^{b1}$, $13^{b2}$ and $13^{b3}$, each consisting of two driven gear members $12^b$ and $12^{b1}$, which have gaps 19, 20 diametrically opposed as before. Each of the gears $13^{b1}$, and $13^{b2}$ and $13^{b3}$ is provided with an eccentric pin $13^{bx}$. Connected to the pin $13^{bx}$ of the gear $13^{b3}$ is a link 68 to which is connected pivotally one end of a lever 70, the other end of which is connected to the link 47 which in turn is connected to the multi-cell shuttle change box 48. The eccentric pin $13^{bx}$ of the gear $13^{b2}$ is connected, as at $69^a$, to the fulcrum of the lever 70, which it carries. The other end of the lever 69 is connected by a link 66 to the eccentric pin $13^{bx}$ of the driven gear $13^{b1}$. Each of the tooth sectors 63, 64 and 65 is provided at its ends with wide teeth $21^b$, $22^b$, which coact with the gear members $12^b$ and $12^{b1}$ of the driven gears $13^{b1}$, $13^{b2}$ and $13^{b3}$ in the same manner as already described with reference to the wide teeth 21, 22 of the driving gears 9, 11 and 10, 11 shown in Figure 1. Through the properly timed coaction of the several gear sectors 63, 64 and 65, which are shifted in an axial direction, as hereinbefore described, under the control of the pattern device, and through the interaction of the levers 69 and 70 the shuttle change box 68 can be shifted to place any one of the several cells in line with the loom shed.

Other embodiments of the invention, all functioning in the same manner will readily suggest themselves to meet different conditions of operation and it will be understood that, except as pointed out in the accompanying claims, the invention is not restricted to the particular construction shown and described herein.

I claim as my invention:

1. In a shuttle box mechanism for looms, the combination of a shuttle box, a reciprocating driving gear, a driven gear for engagement with the driving gear and having diametrically opposed tooth gaps, each of which permits idling movement of the driving gear, a special tooth at the end of the range of gear teeth of the driving gear, which special tooth is wider in an axial direction than the gear teeth and by which the rotation of the driven gear is completed to a half rotation, and operative connections from the driven gear to the shuttle box.

2. In a shuttle box mechanism for looms, the combination of a shuttle box, a plurality of reciprocating driving gears, a plurality of driven gears for engagement with the driving gears respectively and having diametrically opposed tooth gaps each of which permits idling movement of the corresponding driving gear, a special tooth at the end of the range of gear teeth on each driving gear, which special tooth is wider in an axial direction than the gear teeth and by which the rotation of each driven gear is completed to a half rotation, and operative connections from the driven gears to the shuttle box.

3. In a shuttle box mechanism for looms, the combination of a shuttle box, a reciprocating segmental driving gear, a driven gear for engagement with the driving gear and having diametrically opposed tooth gaps, each of which permits idling movement of the driving gear, a special tooth at the end of the range of gear teeth of the driving gear which is wider in an axial direction than the gear teeth and by which the rotation of the driven gear is completed to a half rotation, and operative connections from the driven gear to the shuttle box.

4. In a shuttle box mechanism for looms, the combination of a shuttle box, a rack bar reciprocating in a right line, a driven gear for engagement with the rack bar and having diametrically opposed tooth gaps, each of which permits idling movement of the rack bar, a special tooth at the end of the range of gear teeth of the rack bar, which is wider in an axial direction than the gear teeth of the rack bar and by which the rotation of the driven gear is completed to a half rotation, and operative connections from the driven gear to the shuttle box.

GEORG WIGET.